Aug. 17, 1948.  E. C. GARLAND  2,447,245
MEAT PATTY MOLDING AND CUTTING DEVICE
Filed April 14, 1945  2 Sheets-Sheet 1
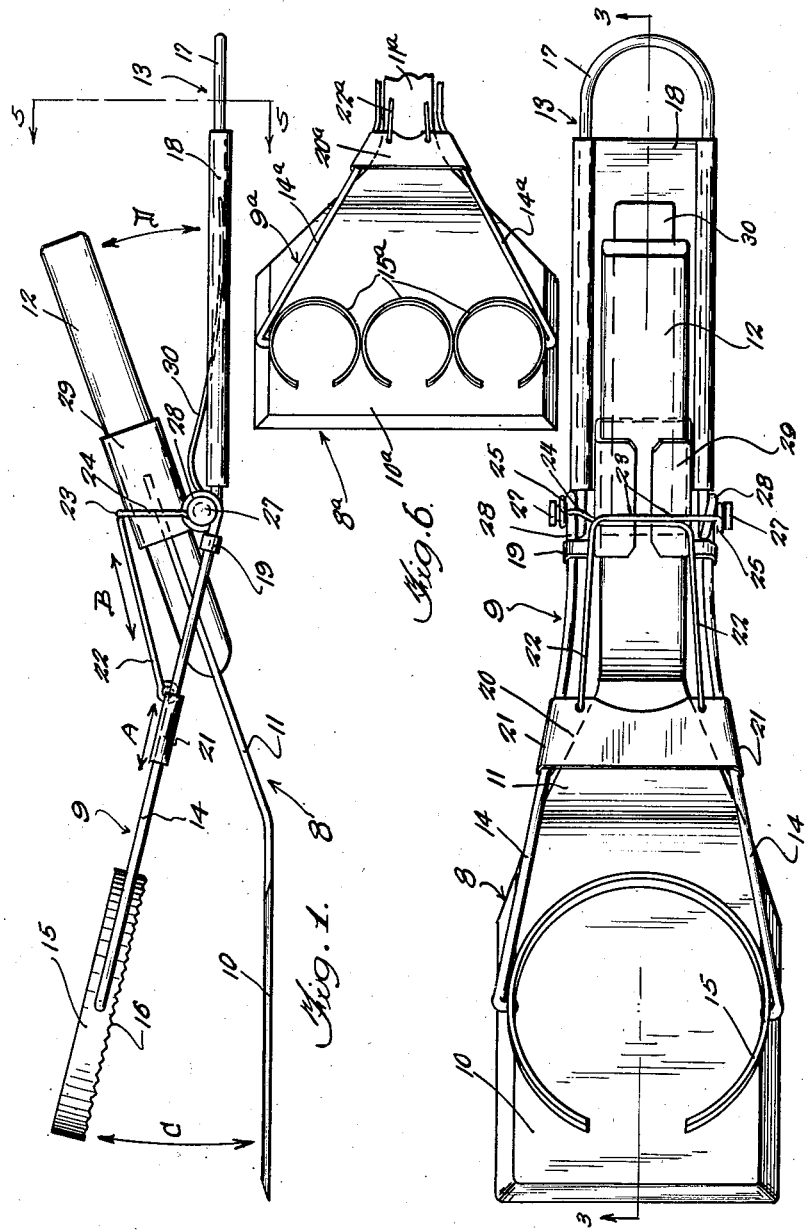
Inventor
Elmer C. Garland,
By Clarence A. O'Brien
and Harvey B. Jackson
Attorneys Aug. 17, 1948.   E. C. GARLAND   2,447,245
MEAT PATTY MOLDING AND CUTTING DEVICE
Filed April 14, 1945   2 Sheets-Sheet 2
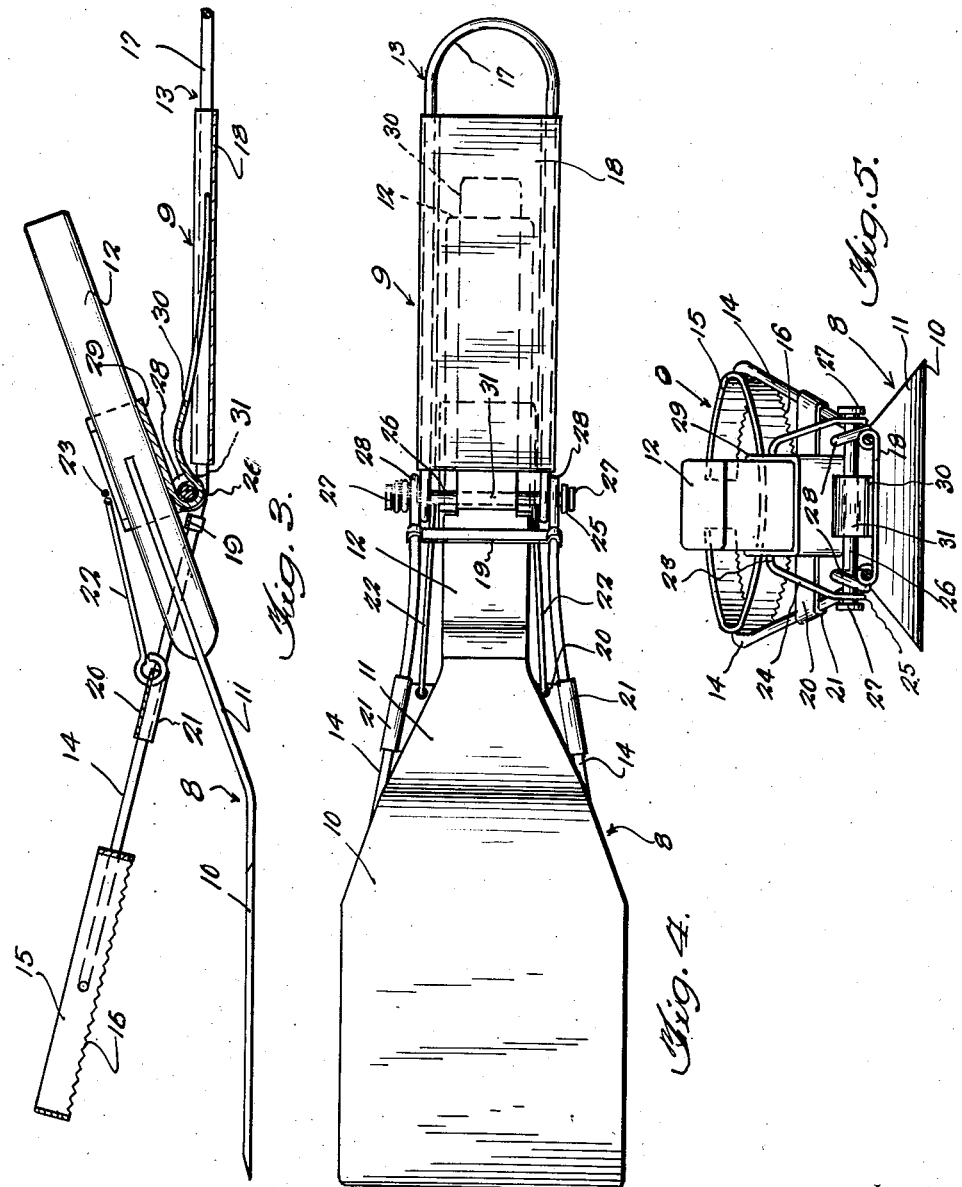
Inventor
Elmer C. Garland,
By
Attorneys Patented Aug. 17, 1948

2,447,245

UNITED STATES PATENT OFFICE 2,447,245

MEAT PATTY MOLDING AND CUTTING DEVICE

Elmer C. Garland, La Conner, Wash.

Application April 14, 1945, Serial No. 588,353

6 Claims. (Cl. 17—32)

1

This invention relates to what is believed to be a structurally distinct, functionally novel and an otherwise improved device expressly adapted for use in cutting and molding food products into cake-like form, the same being highly practical and useful in cutting and molding so-called meat patties.

In carrying out the preferred form of the invention, I have adopted an especially constructed cutting and molding unit, this being in the form of an attachment, that is, an attachment which is expressly fashioned to fit on and coact with a handle on a spatula-like bladed implement, the attachment and implement thus uniting their collective functions in producing a device of the aforementioned type.

In carrying out my aims, I have in mind an attachment which is characterized by an operating handle or lever, an expansible and contractible cutting and molding ring, and a somewhat centrally arranged sleeve, the sleeve serving as a sheath and the latter being adapted to slip on the handle of said knife-like implement. Or, conversely considered, the handle of the implement telescopes into the sleeve-like sheath, thus mounting the attachment on said handle so that the attachment may be applied at will whenever necessary or desired.

Other objects, features and advantages of the invention will become more readily apparent from the following description and the accompanying illustrative drawing.

In the drawings, wherein like numerals are employed to designate like parts throughout the same:

Figure 1 is a side elevational view of the complete device with the main coacting parts open or spaced apart and in readiness for use.

Figure 2 is a top plan view of the structure seen in Figure 1.

Figure 3 is a central longitudinal sectional view, this taken on the plane of the line 3—3 of Figure 2, looking in the direction of the arrows.

Figure 4 is a bottom plan view.

Figure 5 is a section on the plane of the line 5—5 of Figure 1, looking in the direction of the arrows.

Figure 6 is a fragmentary plan view, that is, top plan view, showing a modification.

As is shown to advantage in Figures 1 and 3, the aforementioned spatula-like implement, or, as it is sometimes called, knife, is denoted by the numeral 8. This is one of the main parts previously referred to. The other part, also a unitary device, is the attachment 9. I desire to point out here that it is within the scope of the invention, obviously, to manufacture a complete device characterized by all of the structural features and advantages herein shown and described, or the desired result may be simply attained, as here indicated, by adopting on the one hand a special attachment, and applying this to a somewhat conventional kitchen implement such as is employed as a knife, pancake turner and for other purposes.

The unit or implement 8 comprises a substantially rectangular, spatula-like blade 10 having marginal cutting edges, this having a lateral shank 11 at its inner end to which the wooden or equivalent handle 12 is connected.

The attachment unit or part 9 is characterized in part by a one-piece, substantially U-shaped and elongated wire frame, said frame being unitarily denoted by the numeral 13. The outer or free ends of the arms thereof, as indicated at the points 14, hingedly connect with diametrically opposite portions of the split annular cutter-mold 15. The mold 15 is a split ring having its cutter edge serrated, as at 16, to provide teeth, said teeth coacting with the supporting surface, that is, the food product supporting surface, on the blade 10. The bight portion 17 of the wire frame extends beyond a web-like plate 18. This plate has its marginal edges rolled upon the adjacent portions of the limbs or arms 14 and thus this part of the frame forms a lever or handle. A transverse fixedly mounted brace (see Figs. 3 and 4) denoted at 19 connects the limbs together at a point outwardly beyond the outer end of said web-like plate 18. The arms beyond this brace are movable toward and from each other so as to open and close the cutter-mold 15. It will be noticed at this point that the arms are laterally bent, that is, in side elevation, and also spread apart so that they diverge in top plan. A slidable plate 20 (see Fig. 2) has its opposite ends curled, as at 21, and these slide back and forth like shoes on the diverging arms 14 and the sliding movement is accomplished by a pair of push-pull links 22, these links having their rear ends bent laterally into coacting relation, as indicated at 23, to form handles. The portions beyond said handles are bent down, that is, laterally and down, as indicated at 24, and the down-bent ends terminate in eyes 25, which eyes surround a connecting and assembling pin 26 (see Fig. 5), the pin having headed ends 27 to retain the parts properly interconnected and assembled. I would also direct attention to the fact that the intermediate portions of the side arms of the U frame 13 are bent into coils 28, which coils also surround the headed outer ends of the assembling pin 26. These coils exist (as seen in Fig. 4) between the forward edge of the web plate 18 and the cross-brace 19. The intermediate portion of the pin serves to accommodate the adapter and attaching sleeve 29. This sleeve fits over the wooden handle 12 (see Fig. 3) and has a tang-like extension 30 whose free end rests upon the web plate 18 and whose forward end portion is bent into a hook 31 which hingedly surrounds the intermediate portion of said pin. Thus, the sleeve serves as a sheath for accommodation of the handle 12 and has an extending arm 31 which functions as a spring. This spring spreads the handles of the two parts into diverging relationship, which is the normal position shown in the drawings.

It is evident that the food product to be cut and molded for frying or cooking, as the case may be, is scooped up by way of the blade 10. Then, the handle 12 of the implement 8 is squeezed toward the handle of the attachment 9, the parts being thus moved in the direction of the arrows D. This movement of the handles causes the cutter-mold 15 to move against the blade 10; these parts approaching each other in the direction of the arrows C. The free ends of the cutter-mold 15 are brought together by the slidable contracting and spreading plate 20. When the mold is used for the initial cutting step, the free ends or jaws are closed. After the cutting and molding operation is completed, the plate 20 is moved in the direction of the arrows A, this by moving the links in the direction of the arrows B. Thus, the plate 20 is shiftable back and forth to open and close the mold as desired.

It is understood that the part 8 is a complete knife or kitchen implement in itself. It can be employed individually in the various uses to which it is put in the kitchen. Then, it can be slipped endwise into the sleeve 29 of the attachment, thus permitting it to coact with the attachment in forming the two-part pattie cutting and forming mold.

In the modification seen in Figure 6, the knife or blade unit is indicated at 8a and the mold unit or attachment is indicated at 9a. The blade is denoted at 10a and the shank thereof at 11a. The shift plate is at 20a and moved back and forth by the links 22a. The arms, that is, the diverging arms, are indicated at 14a, and these are provided with a series of cutter molds or rings 15a. The construction and operation of the modification is clear from what has already been set forth.

A careful consideration of the foregoing description in conjunction with the invention as illustrated in the drawings will enable the reader to obtain a clear understanding of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a meat pattie cutting and forming structure of the class described, in combination, a knife including a flat relatively wide blade with a laterally offset handle, an adapter sleeve fitted in sheath-like fashion on said handle, said sleeve carrying a hinge pin, and a frame unit having supporting arms hingedly mounted on said pin, said frame unit being provided with a cutter mold on the outer end thereof movable toward and from said blade, the cutter mold being in the form of a split ring, and the supporting arms of the frame being hingedly connected to diametrically opposite sides of said mold and movable toward and from each other to open and close the mold.

2. In a structural assemblage of the class described, a flat spatula-like blade having a shank, a handle mounted on said shank, a sleeve fitted telescopically on said handle, said sleeve being provided with a hook-like member on its under side, a headed pin seated in said hook-like member, a substantially U-shaped frame, one end thereof being fashioned into a handle movable toward and from said first-named handle, the intermediate arm portions thereof being bent into eyes and said eyes hingedly surrounding the end portions of said pin, the arms beyond said eyes diverging, a slide mounted on said diverging arms to move same toward and from each other, and a split molding ring hingedly mounted between the outer free ends of said diverging arms.

3. In a structural assemblage of the class described, a flat spatula-like blade having a shank, a handle mounted on said shank, a sleeve fitted telescopically on said handle, said sleeve being provided with a hook-like member on its under side, a headed pin seated in said hook-like member, a substantially U-shaped frame, one end thereof being fashioned into a handle movable toward and from said first-named handle, the intermediate portion thereof having its arms bent into eyes and said eyes hingedly surrounding the end portions of said pin, the arms beyond said eyes diverging, a slide mounted on said diverging arms to move same toward and from each other, and a split molding ring hingedly mounted between the outer free ends of said diverging arms, together with a push-pull link arrangement in connection with said slide for moving same back and forth to open and close the mold.

4. In a meat pattie molding and cutting device of the class described, a blade provided with a handle, a sleeve removably mounted on said handle, a hinge pin mounted on said sleeve, a frame unit having supporting arms hingedly mounted intermediate their opposite end portions on said pin, and a cutter mold, the outer ends of said arms being pivotally connected with diametrically opposite portions of said cutter mold and disposing the latter in a position to permit same to swing bodily toward and from said blade, the remaining end portions of said arms forming a second handle and this underlying and being movable toward and from said first-named handle.

5. In a structural assemblage of the class described, a blade having a shank, a handle mounted on said shank, a sleeve on said handle, said sleeve being provided with a hook-like member, a pin seated in said hook-like member, a substantially U-shaped frame, one end thereof being fashioned into a handle and this being opposed to and movable toward and from said first-named handle, said U-shaped frame including arm portions, the intermediate portions of said arms being fashioned and hingedly mounted on the end portions of said pin, the arms beyond said pin being of diverging relationship, a slide mounted on said diverging arms to move same toward and from each other, and an expansible and contractable molding ring, this hingedly mounted between the outer free end portions of said arms.

6. As a new article of manufacture, an attachment for a knife of the type wherein the knife includes a wide relatively flat blade with a laterally offset handle, said attachment comprising a sleeve, a pin mounted on said sleeve, a substantially U-shaped frame including opposed arm portions, one end of the frame being fashioned into a handle, the intermediate portions of the arms being bent into eyes, said eyes being hingedly mounted on the end portions of said pin, the arms beyond said eyes diverging, a slide mounted on said diverging arms to spread same apart and press same together, means for operating the slide, and a split molding ring hingedly mounted between the outer free end portions of said diverging arms.

ELMER C. GARLAND.

REFERENCES CITED

The following references are of record in the file of this patent:

UNITED STATES PATENTS

| Number | Name | Date |
|---|---|---|
| 70,095 | Janney | Oct. 22, 1867 |
| 1,237,826 | Satterquist et al. | Aug. 21, 1917 |
| 1,931,388 | Ling | Oct. 17, 1933 |
| 2,081,080 | Baker | May 18, 1937 |